United States Patent
Myllymaki et al.

(10) Patent No.: US 9,512,302 B2
(45) Date of Patent: Dec. 6, 2016

(54) FLUOROPOLYMER COATINGS

(71) Applicant: Carbodeon Ltd Oy, Vantaa (FI)

(72) Inventors: Vesa Myllymaki, Helsinki (FI); Perttu Rintala, Helsinki (FI)

(73) Assignee: Carbodeon Ltd Oy, Vantaa (FI)

( * ) Notice: Subject to any disclaimer, the term of this patent is extended or adjusted under 35 U.S.C. 154(b) by 1 day.

(21) Appl. No.: 14/041,513

(22) Filed: Sep. 30, 2013

(65) Prior Publication Data

US 2014/0094546 A1    Apr. 3, 2014

Related U.S. Application Data

(60) Provisional application No. 61/706,890, filed on Sep. 28, 2012.

(30) Foreign Application Priority Data

Sep. 28, 2012 (FI) ........................... 20126014

(51) Int. Cl.
C08K 13/02 (2006.01)
C08K 3/04 (2006.01)
C08K 5/01 (2006.01)
C09D 127/18 (2006.01)

(52) U.S. Cl.
CPC ............ *C08K 13/02* (2013.01); *C08K 3/04* (2013.01); *C08K 5/01* (2013.01); *C09D 127/18* (2013.01)

(58) Field of Classification Search
None
See application file for complete search history.

(56) References Cited

U.S. PATENT DOCUMENTS

| 8,911,818 B2 * | 12/2014 | Castellano ............. B82Y 30/00 427/74 |
| 2009/0175776 A1 * | 7/2009 | Saito ..................... B82Y 30/00 423/446 |
| 2010/0233371 A1 | 9/2010 | Kim et al. |

FOREIGN PATENT DOCUMENTS

EP   2 270 121        1/2011
KR   20080093625 A   10/2008

OTHER PUBLICATIONS

Lee et al., Tibological behavior of PTFE nanocomposite filsm reinforced with carbon nanoparticles, Composites, Part B 38, 2007, 810-816.*
http://en.wikipedia.org/wiki/Zeta_potential, Nov. 2004.*
http://en.wikipedia.org/wiki/Colloid, Sep. 2004.*
http://en.wikipedia.org/wiki/Zeta_potential , Nov. 16, 2007.*
http://en.wikipedia.org/wiki/Colloid, Feb. 8, 2006.*
(Continued)

*Primary Examiner* — Satya Sastri
(74) *Attorney, Agent, or Firm* — Berggren, Inc.

(57) ABSTRACT

The present invention relates to a fluoropolymer coating having improved tribological properties, which coating comprises nanodiamond particles in a concentration between 0.01 wt. % and 5 wt. %, wherein said fluoropolymer coating is obtained by drying and curing a slurry composition comprising said fluoropolymer and said nanodiamond particles, wherein the zeta potential of the nanodiamond particles is over −30 mV at pH higher than 8. The invention also relates to a slurry composition which can be used for producing said fluoropolymer coating.

13 Claims, 6 Drawing Sheets

(56) References Cited

OTHER PUBLICATIONS

Ivanov, M.G. et al., Synergistic Compositions of Colloidal Nanodiamond as Lubricant-additive, J. Vac. Sci.—Technol.B—Microelectronics and Nanometer Structures, Jul./Aug. 2010, pp. 869-877, vol. 28, No. 4, American Vacuum Society.
Lim, D.P. et al., Effect of Reinforcement Particle Size on the Tribological Properties of Nana-Diamond Filled Polytetrafluoroethylene Based Coating, Journal of Nanoscience and Nanotechnology, 2009, pp. 4197-4201,vol. 9, No. 7, American Scientific Publishers, United States of America.
Lai, S. et al., The friction and wear properties of polytetrafluoroethylene filled with ultrafine diamond, Wear 260, 2006, pp. 462-468, Elsevier B.V.
Lee, J., et al., Tribological behavior of PTFE film with nanodiamond, Surface & Coatings Technology, Sep. 27, 2004, pp. 534-538, Elsevier B.V.
Lee, J., et al., Tribological behavior of PTFE nanocomposite films reinforced with carbon nanoparticles, Composites: Part B, Jan. 12, 2007, pp. 810-816, Elsevier B.V.
National Board of Patents and Registration of Finland, Search Report, pp. 1-7, Oct. 6, 2013.
International Search Report; PCT/FI2013/050943; Jan. 22, 2014; 3 pages.
Lee et al "Tribological behavior of PTFE nanocomposite films reinforced with carbon nanoparticles"; Composites Part B: Engineering, Elsevier, UK; vol. 38, No. 7-8; Jul. 12, 2007; pp. 810-816; XP022151571, ISSN: 1359-8368, DOI: 10.1016/J.COMPOSITESB.2006.12.006 (abstract).
Lee J Y et al "Tribological behavior of PTFE films reinforced with nanoparticles"; Surface and Coatings Technology, Elsevier, Amsterdam, NL; vol. 188-189, Nov. 1, 2004; pp. 534-538; XP027184871, ISSN: 0257-8972 (abstract).
Lim, D. P., et al; "Effect of reinforcement particle size on the tribological properties of nano-diamond filled polytetrafluoroethylene based coating". Journal of Nanoscience and Nanotechnology, 9(7), 4197-4201 CODEN: JNNOAR; ISSN: 1533-4880, 2009, XP002718680, DOI: 10.1166/JNN.2009.M31 Experimental (abstract).

* cited by examiner

FLUOROPOLYMER COATINGS

PRIORITY CLAIM

This application claims priority of U.S. 61/706,890 and of FI 20126014, both filed on Sep. 28, 2012, and both of which are incorporated herein by reference in their entirety.

TECHNICAL FIELD

The invention relates to fluoropolymer coatings reinforced with nanodiamonds and to a slurry composition which can be used for producing said fluoropolymer coatings.

BACKGROUND OF THE INVENTION

The fluoropolymers (FP) are known for their high chemical resistance. Also amongst the polymers, they have high temperature and wear resistance. The most well-known fluoropolymer is polytetrafluoroethylene (PTFE) having the formula —$(F_2C-CF_2)_n$—. Fluoropolymers are widely used in harsh conditions. They are used in anticorrosive seals, in chemical pipes and valves and in bearings. Another application range is in antiadhesives. Also fluoropolymers are used in high-temperature electronic parts.

Tribology is the science and engineering of interacting surfaces in relative motion. It includes the study and application of the principles of friction, lubrication and wear. Tribology is a branch of mechanical engineering. Materials that are used in tribology have to provide low friction and wear rate and conduct frictional heat. Also they have to carry large normal stresses and even carry electrons in some applications. The main drawbacks of polytetrafluoroethylene are its low wear resistance and thermal conductivity, although it possesses very low friction coefficient. The low friction coefficient of the PTFE is due to its molecular structure. It has un-branched chain-like molecular structure. The chains are linked only with weak Van der Waals forces. Thus the chains slide easily past each other. This results in transfer film formation. However, as the formation and removal cycle is repeated continuously, the wear rate increases and this procedure results in a high wear rate typical to PTFE.

Other common fluoropolymers include poly(vinylidene fluoride) (PVDF), hexafluoropropylene (HFP), fluorinated ethylene propylene (FEP), perfluoroalkoxy (PFA), fluorinated polyimide (FPI) and others.

Nanodiamond (ND) also referred to as ultrananocrystalline diamond or ultradispersed diamond (UDD) is a unique nanomaterial which can be easily produced in hundreds of kilograms by detonation synthesis. There are also other alternative synthesis methods for producing nanodiamonds.

Nanodiamonds can be produced by detonation process of trinitrotoluene (TNT) and hexogen (RDX, royal demolition explosive). The detonation is executed in steel chamber. The nanodiamonds are formed in the high pressure and temperature of the explosion. The chamber is cooled fast after the explosion. The detonation results in diamond blend (DB), which comprises nanodiamonds, amorphous carbon, graphite-like structures and metallic impurities. The content of nanodiamonds in the diamond blend is typically between 30 and 75% by weight. The pure nanodiamonds are extracted by chemical purification process. The diameter of the commercial nanodiamond is about 4 to 5 nm. Still, the nanodiamonds have the tendency to agglomerate and the diameter of the agglomerates can be several micrometers.

Nanodiamonds or nanodiamond compositions can be used, for example, in oils, lubricants, abrasives, coatings, cleaning agents etc.

It has been suggested that low loadings of nanoparticles have an effect on PTFE wear if several factors coincide. First, nanoparticles modify the crystalline morphology of the polymer. Traditional fillers can only reinforce the polymer mechanically. Reinforcement of traditional fillers can comprise supporting loads, initiating crazes and interrupting crack propagation. However, nanoparticles are the size of the polymer lamellae. Thus, the crystallinity of the polymer can alter with the addition thus changing several other physical properties. Second, the addition of nanoparticles can reduce the abrasion. The abrasiveness is lower than with traditional fiber additives or microparticles. Nanofillers polish the rough surfaces while removing little amount of material and thus preparing the surfaces for transfer films. Third, the fluorinated polymers filled with nano-additives can form stable transfer films. These films form when the subsurface damage is low and there are no large abrasive particles to disturb the formation. Films are well adhered, they protect the polymer from the counterface and also the counterface is protected from the abrasives. The film is an interface that has low shear strength. The decomposition of the filler can generate reaction products between the filler and the PTFE, which products can improve the bonding of a transfer film.

According to the literature PTFE composite coatings loaded with various substances have been studied. Such substances include silica, metallic nanoparticles, nanodiamond, nano-attapulgite, lanthanum oxide, titanium oxide, Kevlat fabric, grapheme, multiwalled carbon nanotubes (MWCNT) and single wall carbon nanotubes (SWCNT).

Lee J-Y. et al., Tribological behavior of PTFE film with nanodiamond. Surface & Coatings Technology. 188-189 (2004), pages 534-538, studied the behavior of PTFE films with a nanodiamond addition. Nanodiamond was supposed to enhance the wear resistance while maintaining low coefficient of friction (COF) of PTFE. This was due to the nanoscaled size, good mechanical properties and thermal conductivity. Nanodiamond-PTFE composite slurry was mixed from nanodiamonds dispersed in distilled water and PTFE aqueous suspension. The slurry was sprayed on aluminum substrate. The nanodiamond content in the composite was in the range of 0-4 wt. %. A heat treatment was performed for the coating. The film thickness was 30 μm. The tribological properties of the film were examined with ball-on-plate test apparatus. The wear was evaluated by measuring the width of the worn track.

The optimum wear properties were achieved at 2 wt. % nanodiamond content. The wear increased both with decreasing nanodiamond content and also with higher contents. COF was reduced with nanodiamond addition, from 0.21 to 0.16 at room temperature and from 0.12 to 0.08 at 150° C. Also the COF reached its optimum value at 2 wt. % nanodiamond content. The increased wear with higher nanodiamond contents was linked with the increasing agglomeration rate of nanodiamonds. Also COF increased slightly with higher contents, which could be due to the agglomeration. The tribological behavior of the composite was dominated by creation of thin transfer layer. Transfer layer, which reduces friction and wear, was formed by PTFE and nanodiamonds that are torn off the matrix. It was proposed that nanodiamonds roll within the film thus contributing to lowering the frictional force in the interface.

Lee J-Y. et al., Tribological behavior of PTFE nanocomposite films reinforced with carbon nanoparticles, Composites Part B: Engineering, 38:7(2007), pages 810-816, examined the tribological properties of PTFE-carbon nanoparticle-nanocomposites. PTFE coatings were reinforced with onion-like-carbon (OLC). OLC was produced by annealing nanodiamonds in temperature range of 1000-1900° C. Nanodiamonds were observed to retain their structure until 1000° C. They started to convert to graphitic sheets when the temperature reached 1300° C. The annealed particles were dispersed by attritional milling. OLC-PTFE slurry was obtained by mixing the aqueous dispersions of them, only that OLC dispersion contained an anionic surfactant to improve the dispersion rate. The slurry was coated on aluminum substrate. Coating thickness was 10 µm. The tribological properties were investigated with ball-on-plate-test.

The nanodiamonds and carbon onions are themselves solid lubricants and thus they didn't increase the friction coefficient, which occurs normally when PTFE is filled. The lowest friction coefficient was achieved with unannealed nanodiamonds, although the effect of annealing to the friction coefficient was negligible. All the measured values of COF were at the same level as pure PTFE. The nanodiamond (before annealing) already reduces the wear coefficient. Moreover, the lowest wear coefficient was achieved with the carbon onions treated in 1000° C. The heat treatment reduces the bonding strength between the nanodiamond particles. Especially at 1000° C. the effect of the reduced bonding was observed, the smallest particle size was achieved with this treatment.

The dispersion of the nanoparticles is affected by the bonding strength and surface conditions. The wear properties relate to size effects and the surface properties. Thus, the best wear resistance was achieved with particles that were heat treated at 1000° C. as fillers. This was because they had smallest particle size and could be well dispersed in the PTFE matrix. The damage amount at worn surfaces was reduced in PTFE composites with the addition of untreated nanodiamonds and the ones treated at 1000° C.

Lai S-Q. et al., The friction and wear properties of polytetrafluoroethylene filled with ultrafine diamond. Wear, 260:4-5 (2006), pages 462-468, studied the tribological properties of polytetrafluoroethylene-nanodiamond-composites. The nanodiamonds, which were used as PTFE fillers, were purified. The purified nanodiamonds had an averaged particle size of 10 nm, although they were agglomerated to larger clusters. The PTFE was in aqueous dispersion, in which the nanodiamonds were mechanically mixed. The composite was molded into blocks that were sintered by heating. The nanodiamond loading was 0-10 wt. %. The nanodiamonds in the PTFE matrix were poorly dispersed and were aggregated into clusters with diameters from several hundred nanometers to several micrometers. Wear test was performed to the composite with a block-on-ring experimental arrangement.

According to Lai S-Q. et al., the lowest friction coefficient (0.18) was achieved at 0.5 wt. % nanodiamond content. The wear decreased sharply as the nanodiamond content increased but turned to decrease slightly after the nanodiamond content exceeded 3 wt. %. When the worn surfaces were examined, it was discovered that the nanodiamond particles had congregated on worn surface. Under wear, nanodiamonds have a load-carrying capacity. They can also roll and slide under friction process. Thus, it was concluded that the macromolecular sliding friction of pure PTFE changed to mixture of sliding and rolling friction in the composites. The transfer film was formed in the interface and the steel counterface was not abraded by the composite. The debris of the composite was smaller than that of pure PTFE, which indicated that nanodiamond addition inhibited the formation of larger debris particles. Thus the wear was reduced.

In view of the above, there exists a demand for a fluoropolymer composite coating having improved properties. The aim of the invention is to provide a fluoropolymer composite coating having improved tribological properties.

SUMMARY OF THE INVENTION

The present invention relates to a fluoropolymer coating comprising nanodiamond particles in a concentration between 0.01 wt. % and 5 wt. %, said coating having a friction coefficient which is reduced at least by 25% as compared to a reference sample without any nanodiamond addition, measured at room temperature.

The invention also relates to a slurry composition comprising a fluoropolymer and nanodiamond particles, provided that at least one of following provisions is fulfilled:
i) the pH of the slurry is within the alkaline region,
ii) the zeta potential of the nanodiamond particles is negative at pH higher than 8,
iii) the nanodiamond particles contain graphite and amorphous carbon originating from the production of the nanodiamonds.

This slurry composition can be used for producing said fluoropolymer coatings.

DETAILED DESCRIPTION OF THE INVENTION

Figure 1:
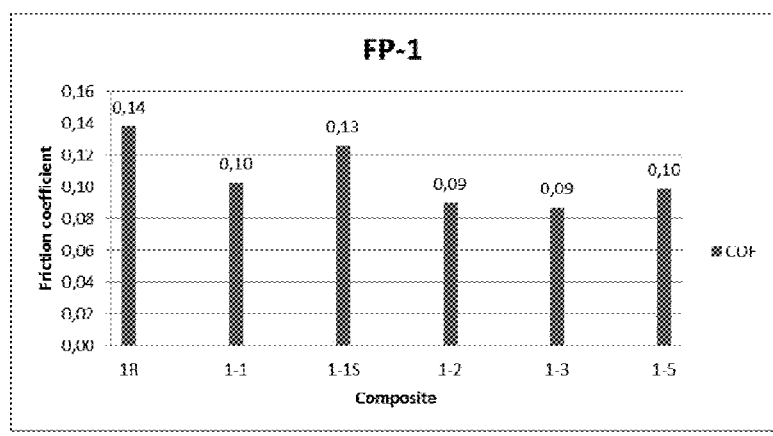
FIG. 1 shows the friction coefficients of a reference coating and composite coatings of the present invention.

In a first aspect of the present invention there is provided a slurry composition comprising a fluoropolymer and nanodiamond particles, provided that at least one of following provisions is fulfilled:

i) the pH of the slurry is within the alkaline region,
ii) the zeta potential of the nanodiamond particles is negative at pH higher than 8,
iii) the nanodiamond particles contain graphite and amorphous carbon originating from the production of the nanodiamonds.

A preferred embodiment of the present invention provides a slurry composition comprising a fluoropolymer and nanodiamond particles, provided that the following provisions are fulfilled:
i) the pH of the slurry is within the alkaline region,
ii) the zeta potential of the nanodiamond particles is over −30 mV at pH higher than 8, The pH of the slurry is preferably at least 8, more preferably between 9 and 11, and most preferably between 9 and 10.

The zeta potential of the nanodiamond particles is preferably over −30 mV, more preferably over −40 mV at pH higher than 8.

The slurry may as liquid medium comprise water, an organic solvent, a mixture of water and an organic solvent or a mixture of organic solvents. Suitable solvents are e.g. xylene, N-methyl pyrrolidone (NMP), gamma-butyrolactone and ethylbenzene and mixtures of two or more of these solvents.

In a preferred embodiment the nanodiamond particles are included into the slurry in the form of a suspension or dispersion wherein the concentration of the diamond nanoparticles is at most 5% by weight, preferably between 0.01% by weight and 5% by weight, as calculated from the slurry solid matter content.

The nanodiamond particles in the suspension or dispersion may be substantially in single digit form or in agglomerated form. The D90 particle size of the single digit form is preferably between 8 nm and 30 nm, more preferably between 10 nm and 20 nm. The D90 particle size of the agglomerated form is preferably between 30 nm and 1000 nm, more preferably between 30 nm and 500 nm.

Examples of suitable monomers used for preparing the fluoropolymers are the following: ethylene (E), propylene (P), vinyl fluoride (VF1), vinylidene fluoride (VDF or VF2), tetrafluoroethylene (TFE), hexafluoropropylene (HFP), perfluoro-propylvinylether (PPVE), perfluoromethylvinylether (PMVE) and chlorotri-fluoroethylene (CTFE).

Examples of preferred fluoropolymers are the following: PVF (poly-vinylfluoride), PVDF (polyvinylidene fluoride), PTFE (polytetrafluoroethylene), PCTFE (polychlorotrifluoroethylene), PFA (perfluoroalkoxy polymer), FEP (fluorinated ethylene-propylene), ETFE (polyethylenetetrafluoroethylene), ECTFE (polyethylenechlorotrifluoroethylene), FFPM/FFKM (perfluoroelastomer), FPM/FKM (fluorocarbon, such as chlorotrifluoroethylenevinylidene fluoride), PFPE (perfluoropolyether), PFSA (perfluorosulfonic acid), FPI (fluorinated polyimide) and perfluoropolyoxetane and mixtures of two or more of these polymers. An especially preferred fluoropolymer is PTFE.

The nanodiamond particles may be essentially pure nanodiamond particles, preferably having a nanodiamond content of at least 95% by weight, more preferably at least 97% by weight.

The nanodiamond particles may also contain graphitic and amorphous carbon originating from the production of the nanodiamonds by detonation, the content of oxidisable carbon preferably being at least 5% by weight, more preferably at least 10% by weight. The content of oxidisable carbon may also be 20% by weight or higher.

The invention also relates to the use of said slurry composition for the production of a fluoropolymer coating.

In a second aspect of the present invention there is provided a fluoropolymer coating comprising nanodiamond particles in a concentration between 0.01 wt. % and 5 wt. %, said coating having a friction coefficient which is reduced at least by 25% as compared to a reference sample without any nanodiamond addition, measured at room temperature.

A preferred embodiment of the present invention provides a fluoropolymer coating comprising nanodiamond particles in a concentration between 0.01 wt. % and 5 wt. %, wherein said fluoropolymer coating is obtained by drying and curing a slurry composition comprising said fluoropolymer and nanodiamond particles, wherein the zeta potential of the nanodiamond particles is over −30 mV at pH higher than 8.

The concentration of the nanodiamonds in the coating is preferably between 0.1% by weight and 4% by weight, more preferably between 0.1% by weight and 3% by weight, and most preferably between 1% by weight and 3% by weight.

The preferred fluoropolymers are as defined above.

In a preferred embodiment the coating comprises polytetrafluoroethylene and said friction coefficient is at most 0.08, preferably at most 0.07.

In another preferred embodiment said coating shows a wear which is reduced at least by 10%, more preferably at least by 25% as compared to a reference sample without any nanodiamond addition, measured at room temperature. A preferred coating is polytetrafluoroethylene. The wear tests were Taber wear tests made according to the standard SFS EN 13523-16.

The fluoropolymer coating according to the invention is preferably obtained by drying and curing a slurry composition comprising said fluoropolymer and nanodiamond particles. A preferred slurry composition is as defined above.

The pH of the slurry is preferably within the alkaline region, more preferably at least 8, yet more preferably between 9 and 11, and most preferably between 9 and 10.

The zeta potential of the nanodiamond particles is preferably over −30 mV, and most preferably over −40 mV at pH higher than 8.

The nanodiamond particles may contain graphite and amorphous carbon originating from the production of the nanodiamonds The employed nanodiamond particles may be substantially in single digit form or in agglomerated form. The D90 particle size of the single digit form is preferably between 8 nm and 30 nm, more preferably between 10 nm and 20 nm. The D90 particle size of the agglomerated form is preferably between 30 nm and 1000 nm, more preferably between 30 nm and 500 nm.

The employed nanodiamond particles may be essentially pure nanodiamond particles, preferably having a nanodiamond content of at least 95% by weight, more preferably at least 97% by weight. The employed nanodiamond particles may also contain graphitic and amorphous carbon originating from the production of the nanodiamonds, the content of oxidisable carbon preferably being at least 5% by weight, more preferably at least 10% by weight. The content of oxidisable carbon may also be 20% by weight or higher.

The invention is now described in light of non-limiting examples.

EXAMPLES

Materials

The polymer materials used in the examples are commercial fluoropolymer slurries and are referred as FP-1, -2, and -3. FP-1 is a PTFE polymer dispersed in water. FP-2 is a FEP polymer dispersed in water and xylene. FP-3 is FEP polymer dispersed in a solvent mixture of xylene, N-methyl pyrrolidone (NMP), gamma-butyrolactone and ethylbenzene. The properties of the fluoropolymer slurries are presented in Table 1.

TABLE 1

| Fluoropolymer (FP-) | pH (water-based) | Zeta potential (mV) | D90 (nm) | Visual appearance |
|---|---|---|---|---|
| 1 | 10.3 | −50.7 | 373 | milky white slurry |
| 2 | 9.7 | −27.9 | 303 | milky white slurry |
| 3 | — | — | — | black slurry |

These fluoropolymers are topcoat materials of two-coat systems. The two-coat systems include also primer polymers. The topcoat polymers FP-1, -2 and -3 are sprayed on top of primer polymers P-1, P-2 and P-3, respectively.

Most of the employed nanodiamonds are commercial grades and they are referred as ND-1, -1S, -1N, -2, -3, -4, -5 and -6. Nanodiamonds were dispersed in deionized water in grades ND-1, -1S, -2, -3, -5 and -6. The ND-1N and -4 slurries were based on organic solvent, namely N-Methyl-pyrrolidone (NMP). The nanodiamond grades ND-3 and -6 were diamond blend that contains the detonation soot (graphitic and amorphous carbon). Other grades were pure nanodiamond. The nanodiamond data for the materials as received and without any further agglomeration control through pH adjustment and/or sonication is presented in Table 2.

TABLE 2

| Nanodiamond grade (ND-) | pH (water-based) | Zeta potential (mV) | D90 (nm) | Visual appearance |
|---|---|---|---|---|
| 1 | 10.5 | −47.7 | 5610 | grey suspension |
| 1S | 8.8 | −39.9 | 10.5 | black dispersion |
| 1N | — | −47.7 | 5610 | grey suspension |
| 2 | 10.4 | −52.4 | 219 | black suspension |
| 3 | 8.6 | 19.2 | 2540 | black suspension |
| 4 | — | 28.7 | 18.2 | black dispersion |
| 5 | 4.4 | 47.8 | 14.5 | black dispersion |
| 6 | 7.0 | 18.9 | 6060 | black suspension |

ND-1 was an agglomerated grade in deionized water; ND content ≥97 wt. %
ND-1S was a single digit dispersion in deionized water; ND content ≥97 wt. %
ND-1N was an agglomerated grade in NMP (the same ND product as in ND-1)
ND-2 was a pH adjusted agglomerated grade in deionized water; ND content ≥97 wt. %
ND-3 was an agglomerated grade in deionized water, the blend contains the detonation soot (graphitic and amorphous carbon); ND content ≥50 wt. %
ND-4 was a single digit dispersion in NMP; ND content ≥97 wt. %
ND-5 was a single digit dispersion in deionized water; ND content ≥97 wt. %
ND-6 was an agglomerated grade in deionized water obtained from the same blend as in ND-3.

The zeta potential of a dispersion is defined as the electrical potential between the "free" dispersion medium and the stationary layer of fluid on the nanoparticle surface. The zeta potential is a measure for the colloidal stability of the dispersion. The higher the absolute value of the zeta potential is, the higher is the stability of the dispersion. The zeta potential of the particles depends on the solution pH. With low pH values the zeta potential is positive and with high pH values the zeta potential is negative. The pH, in which the zeta potential is zero, is called the isoelectric point (IEP).

The particle sizes presented in this study are D90 values. This means that 90% of the particles in the sample have smaller diameter than the D90 value.

The composite coatings in this study are marked as "number-number". The first number is the fluoropolymer number (FP-) and the second number refers to nanodiamond grade (ND-). For example, the composite of FP-1 and ND-2 is marked as "1-2". The reference samples are referred as 1R, 2R and 3R. The concentrations used in the study are presented in weight percentages. All the percentages presented are the nanodiamond concentrations in the composite coating:

$$c_{composite} = \frac{m_{ND}}{m_{ND} + m_{FP}} = \frac{c_{NDsuspension} m_{NDsuspension}}{c_{NDsuspension} m_{NDsuspension} + c_{FPslurry} m_{FPslurry}} \quad (1)$$

where $C_{NDsuspension}$ and $m_{NDsuspension}$ refer to the parameters of the nanodiamond grades and $C_{FPslurry}$ and $m_{FPslurry}$ refer to the concentration and mass of the fluoropolymer slurries. The concentrations in Equation 1 are the weight percentages of the solids both in nanodiamond suspensions (or dispersions) and in fluoropolymer slurries.

The fluoropolymer solids concentration is presented in Table 3.

TABLE 3

| | Fluoropolymer | | |
|---|---|---|---|
| | FP-1 | FP-2 | FP-3 |
| Concentration (wt. %) | 58.5-61.5 | 43.8-46.8 | 27.27 |
| Concentration used in calculations (wt. %) | 60.0 | 45.3 | 27.27 |

The nanodiamond concentration in suspensions/dispersions is presented in Table 4.

TABLE 4

| Nanodiamond grade (ND-) | 1 | 1S | 1N | 2 | 3 | 4 | 5 | 6 |
|---|---|---|---|---|---|---|---|---|
| Concentration (wt. %) | 5.0 | 2.9 | 5.0 | 4.75 | 5.0 | 1.0* | 5.0 | 5.0 |

*The concentration in w/V %.

Experimental Work

The experimental work was divided in four different parts: the measuring of starting materials' properties, the mixing tests of the fluoropolymers and nanodiamonds, the coating experiments with the composite slurries and the tribological testing of these coatings. The coating experiments were still divided to two sets: first was done with a wide set of different composites. The second set was executed with fewer composites that were selected based on the results of the first set. In the second set the selected composites were tested in different concentrations, as in the first set the concentration was fixed.

Measuring the Starting Materials' Properties

Both fluoropolymer and nanodiamond pH's were measured with VWR pHenomenal-pH-measurement device. The zeta potential and particle size measurements were done with Malvern Zetasizer Nano ZS, which measures zeta potential by determining electrophoretic mobility. Electrophoretic mobility is measured by applying electric field to the sample in liquid media and measuring the speed of the particles. The particle speed is measured by laser doppler velocimetry (LDV). The zeta potential is obtained from the electrophoretic mobility by applying Henry's equation (Equation 2):

$$U_E = \frac{2\varepsilon z f(ka)}{3\eta} \quad (2)$$

where $U_E$ is the electrophoretic mobility, z is the zeta potential, $\varepsilon$ is the dielectric constant, $\eta$ is viscosity and $f(ka)$ is Henry's function. (Malvern Zetasizer Nano ZS manual)

Zetasizer uses dynamic light scattering (DLS) to measure the particle size. DLS measures the Brownian motion of the particles and relates this to the size of the particles. In general, small particles move faster compared to larger particles due to Brownian motion. Thus the sizes can be separated. It should be perceived that the upper diameter limit that the device can measure is approximately 5-6 μm and thus the agglomerates of certain nanodiamond grades can be even larger than the measurements demonstrate. (Malvern Zetasizer Nano ZS manual)

Mixing Tests

The fluoropolymer slurries were mixed with nanodiamond grades to observe how fast they disperse together and more importantly, how the composite slurry acted after the mixing, when it was left to settle. The mixing tests were done in room temperature. The mass of the polymer samples was 30 g. The nanodiamond concentrations of the composites were 0.1, 0.5, 1.0, 2.0 and 3.0/5.0 wt. % for the suspensions. The dispersions were mixed in nanodiamond concentrations 0.05, 0.1, 0.5 and 1.0 wt. %.

The nanodiamond suspensions were mixed with magnetic mixer for 15 minutes (300 rpm) and then sonicated for 60 minutes with Hielscher UP400S, still mixing the suspension (200 rpm), to reduce the used agglomerated nanodiamond grades D90's well below 1000 nm. The fluoropolymer slurry was mixed so that the vortex appeared and then the nanodiamond suspension/dispersion was added drop by drop. The mixing tests were evaluated by visual observation.

The Coating Experiments

The composite slurries that were prepared for the first set were all in fixed concentration of 1.0 wt. % for the nanodiamond suspensions and 0.1 wt. % for the nanodiamond dispersions. In the second set the composite samples contained 0.1, 0.5, 1.0, 2.0 and 3.0 wt % nanodiamonds made from suspension grades of nanodiamonds. The dispersion grades were mixed to fluoropolymers in 0.05, 0.1, 0.25, 0.5 and 1.0 wt. % nanodiamond concentrations in the composite. Prior to mixing the composite slurries, the nanodiamond suspensions were mixed for 30 minutes (300 rpm) and sonicated with Hielscher UP400S for 60 minutes, still mixing the suspension (200 rpm). This was done in both first and second set. The samples made for the coatings and their preparation time (hours before coating) can be found in Table 5.

TABLE 5

| Fluoropolymer | ND grades in composites (ND-) | Concentration set | Preparation time (h before coating) |
|---|---|---|---|
| First set | | | |
| FP-1 | reference | R | — |
|  | 1, 2, 3 | A1 | 5 |
|  | 1S, 5 | B1 | 4 |
| FP-2 | reference | R | — |
|  | 1, 2, 3 | A1 | 7 |
|  | 1S, 5 | B1 | 6 |
| FP-3 | reference | R | — |
|  | 1N | A1 | 80 |
|  | 4 | B1 | 80 |
| Second set | | | |
| FP-1 | reference | R | — |
|  | 1, 2, 6 | A2 | 20 |
| FP-2 | reference | R | — |
|  | 2, 6 | A2 | 16 |
|  | 1S | B2 | 16 |
| FP-3 | reference | R | — |
|  | 1N | C2 | 24 |

| Concentration sets | Concentrations (wt. %) |
|---|---|
| R | 0.0 |
| A1 | 1.0 |
| B1 | 0.1 |
| A2 | 0.1, 0.5, 1.0, 2.0, 3.0 |
| B2 | 0.05, 0.1, 0.25, 0.5, 1.0 |
| C2 | 0.1, 0.5, 1.0, 2.0, 3.0, 10.0 |

Coatings were done on stainless steel (EN 1.4301/AISI 304) substrates. The substrates were approximately 100 mm×100 mm square plates. The thickness of the plates was 1 mm and 3 mm. Thinner samples were to be used in wear tests and the thicker plates were to be used in friction testing. Holes of 6.5 mm were drilled to the 1 mm thick substrates to fit the wear tester. The samples were sand blasted to ensure the proper adhesion of the primer polymer. The sand blasting was done with alumina particles, grade F60.

On top of the sand blasted specimens were sprayed the primers. Topcoats were sprayed on top of the primers. The spraying was done with gravity spray guns in room temperature. Both the primers and topcoats were dried and cured according to Table 6, with same procedure in both first and second sets. In the first set, the gravity feed cup was washed after every spraying, before the spraying of the next composite. In the second set, the composites were sprayed thus that the lowest concentration was sprayed first, moving up to the highest concentration. After all the concentrations were sprayed for one composite, the gravity feed cup was washed.

TABLE 6

| Polymer | Drying T (° C.) | Drying t (min) | Curing T (° C.) | Curing t (min) |
|---|---|---|---|---|
| P-1 | RT | 60 | — | — |
| FP-1 | 100 | 10 | 410 | 5 |
| P-2 | 120 | 10 | — | — |
| FP-2 | 100 | 10 | 380 | 20 |
| P-3 | 110 | 10 | — | — |
| FP-3 | 110 | 20 | 240 | 20 |

The thickness and the surface roughness were measured after the coating. The thicknesses were measured with elcometer 456. The surface roughnesses were tested with Ra tester, being Taylor Hobson Pneumo Surtronic 10.

Tribological Testing

Friction of the fluoropolymers was tested with pin-on-disk test method. The method was selected on the basis of the literature review. The ball-on-plate method used in the literature has the same principle. The chosen parameters were of the same magnitude as found in the literature. The precise selections were device dependent. Taber wear test was selected because fluoropolymer producers use it to test wear. Wear test results and the parameters used are presented in the data sheets provided by the producers. The test is also standardized and was executed accordingly.

Friction Measurements

Friction coefficient was tested with pin-on-disk equipment. The sample was fixed to a revolving holder. A steel ball sled on the top of the sample. The speed was 3.9 cm/s. The pin load was 2.9 N. One test took 10 minutes and every coating was tested with 3 samples. The result presented in this study is the average of the three tests. The device measured lateral force, although it was converted to voltage to computer. The voltage curve was then analyzed to find out the static friction zone of the test. The voltage results of that zone were then averaged. The average was converted back to lateral force by calibration curve. Thus the friction coefficient was calculated by Equation 3:

$$\mu = \frac{F_{lateral}}{F_{normal}} \quad (3)$$

Wear Tests

The wear resistance of the samples was tested with Taber 5131 Abraser-wear tester. The tests were done according to the standard SFS EN 13523-16 with a few exceptions that are described below. The principle of the Taber wear test is simple: the sample is fixed on the revolving sample holder. On top of the sample are two abrading discs, which roll freely on top of the sample as the sample holder revolves, thus abrading the sample. After certain amount of cycles revolved, the test is stopped and the mass loss is measured. The wear is reported in milligrams at certain cycles with certain load used. The abrading discs are refaced every 1000 revolutions with 150 grit abrasive papers. The load is reported as the mass of the additional load per arm. The scale accuracy is 0.1 mg. (Standard SFS EN 13523-16)

The wear tests were continued with each sample as long as the coating was broken and the substrate was exposed. According to the standard, the tests were stopped every 250 or 500 cycles, depending on the composite. However, if the substrate was exposed already at 250 cycles, the test was continued to 500 cycles to get comparable values. The abrading discs wore also during the test. The discs were allowed to wear longer than specified in the standard, to the limit that was marked on the discs by the producer, the disc diameter being 41.50 mm.

The test was performed using CS-17 abrasive discs with 1000 g additional load per arm to provide harsh conditions. These conditions were also used in the data sheet provided by the producer of FP-2. The results were compared at 500 revolutions. The revolution speed was 60 rpm. The temperature was 20° C. and the air humidity was 37%. The vacuum level of the suction device was 100%. The wear was measured from three samples per coating and the result presented in this study is the average of these results.

Structural Review with SEM

The structure of the coating was viewed by scanning electron microscope. No deep analysis was made of the structure of the polymers. SEM was Hitachi 4700. SEM samples were sputtered with gold particles to make the samples electrically conducting. The structure of each coating was photographed in small magnifications with SEM. Higher magnifications with SEM were tried, but problems occurred because of the charging and the heating of the sample.

Results

The results obtained from the tests are presented. The mixing experiments were evaluated verbally. The friction and wear results are presented as graphs.

Thicknesses and Surface Roughness

The thicknesses have to be regarded to fully understand the wear results. In the first set, for example, the composite 1-3 shows high wear. However, comparing the wear result to the thickness result, it is clear that the composite coatings are just so thin that the wear appears to be high, although it is not likely that much greater than the others. The surface roughness (Ra) tells about the quality and the porosity of the coating. The smaller the surface roughness is, the smaller the porosity of the coating is and the quality better.

In table 7 are presented surface roughness Ra (μm) of composites 1-1, 1-2 and 2-1S. Reference samples are PTFE polymer (FP-1) and FEP polymer (FP-2). The reference and the composite were coated on a 1 mm steel substrate.

TABLE 7

| Sample/composite | Nanodiamond concentration (wt. %) | Surface roughness (μm) |
|---|---|---|
| FP-1 (reference) | 0 | 2.7 |
| 1-1 | 0.1 | 2.7 |
| 1-1 | 0.5 | 2.3 |
| 1-1 | 1.0 | 1.4 |
| 1-1 | 2.0 | 1.3 |
| 1-1 | 3.0 | 1.0 |
| 1-2 | 0.1 | 1.4 |
| 1-2 | 0.5 | 1.3 |
| 1-2 | 1.0 | 0.8 |
| 1-2 | 2.0 | 0.9 |
| 1-2 | 3.0 | 0.9 |
| FP-2 (reference) | 0 | 3.3 |
| 2-1S | 0.05 | 2.1 |
| 2-1S | 0.1 | 0.7 |
| 2-1S | 0.25 | 0.5 |
| 2-1S | 0.5 | 1.1 |
| 2-1S | 1.0 | 0.7 |

It can be seen from table 7 that surface roughness (Ra) decreased 63% (from 2.7 to 1.0) when composite comprised 3 wt. % of nanodiamond particles (sample 1-1). Sample 1-1 represents commercial nanodiamond suspension uDiamond Allegro.

Surface roughness (Ra) decreased 70.4% (from 2.7 to 0.8) when composite comprised 1 wt. % of nanodiamond particles (sample 1-2). Sample 1-2 represents commercial nanodiamond suspension Allegro, which pH has been adjusted into around 9.

Decrease of surface roughness (Ra) was 85% (from 3.3 to 0.5) when composite comprised 0.25 wt. % of nanodiamond particles (sample 2-1S). Sample 2-1S is representing commercial highly zeta negative nanodiamond dispersion known as uDiamond Vox D.

Tribological Results of the First Set

The results are presented in graphs (FIGS. 1 to 3) that include the composites made of one fluoropolymer. The concentration of the nanodiamonds was 1.0 wt. % with suspension grades of nanodiamonds and 0.1 wt. % with dispersion grades.

Friction

The friction of the composites is presented by comparing the friction coefficients. FIG. 1 demonstrates the friction results from the first set of the coatings. The lowest friction coefficient of the water-based fluoropolymer FP-1 was obtained with nanodiamond grade ND-3 addition. It should be noted that the friction coefficients were only measured at room temperature conditions, and based on prior art it can be assumed that the measured friction coefficients should be reduced further as measured at elevated temperatures, alike 150° C.

Wear

Figure 2:
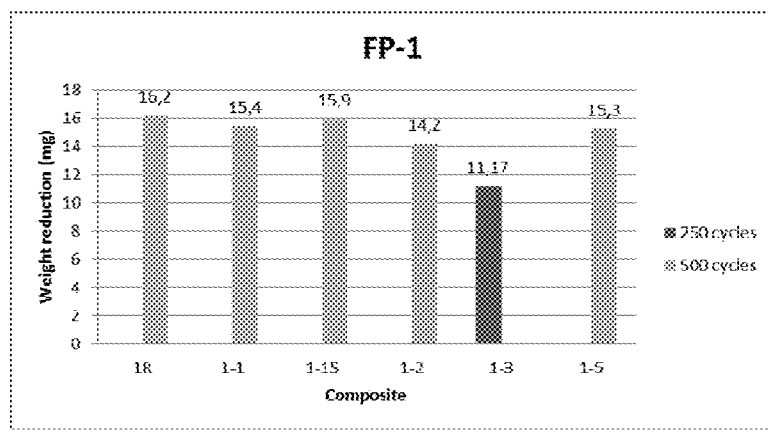
FIG. 2 shows the wear of the same coatings as in FIG. 1.
Figure 3:
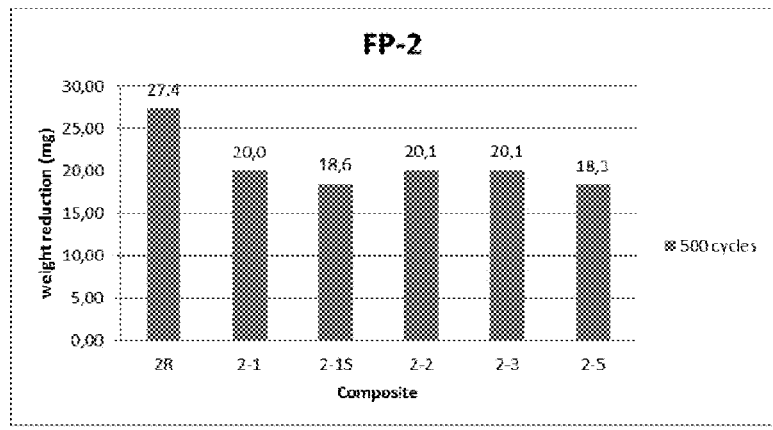
FIG. 3 shows the wear of a reference coating and composite coatings of the present invention.

The wear results of the first set are presented in FIG. 2 and FIG. 3. The lowest wear was acquired with nanodiamond grade ND-2 (FP-1) and ND-5 (FP-2). The values were 14.2 mg and 18.3 mg, respectively. In FIG. 2, the substrate of the composite coating 1-3 was exposed already at 250 cycles. The coating was so severely damaged that the test could not be continued.

Tribological Results of the Second Set

The samples of the second set were based on the results of the first set. The composites were chosen on the basis of both tribology and visual appearance. For example, the composites comprising nanodiamond grade ND-5 were rejected from further studies because of their visual appearance, although their wear resistance was fairly good. The nanodiamonds agglomerate and stay on top of the slurry. They could not be dispersed to the polymer.

Friction

Figure 4:
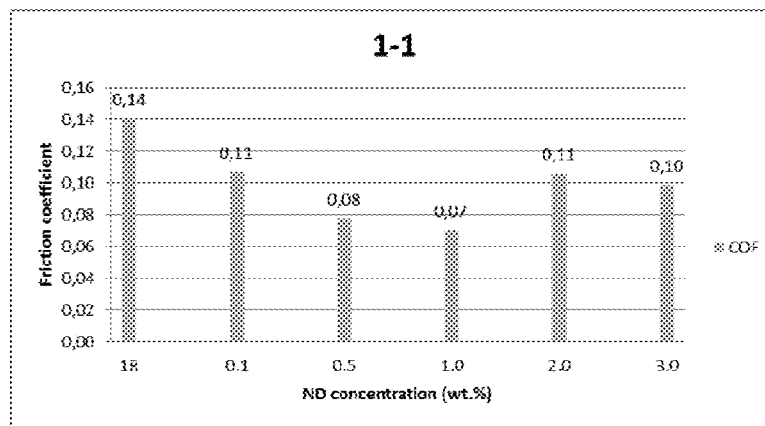
FIG. 4 shows the friction coefficients of a reference coating and a composite coating of the present invention at various nanodiamond concentrations.
Figure 5:
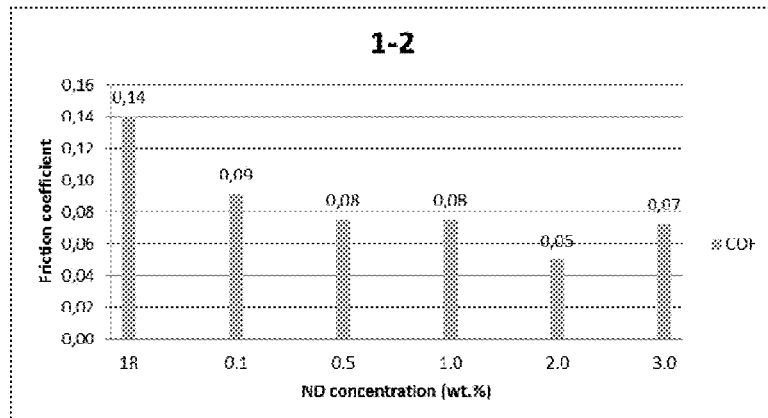
FIG. 5 shows the friction coefficients of a reference coating and another composite coating of the present invention at various nanodiamond concentrations.
Figure 6:
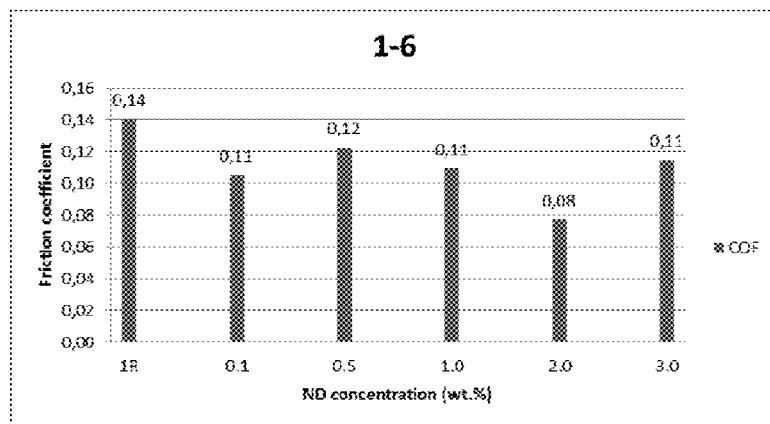
FIG. 6 shows the friction coefficients of a reference coating and yet another composite coating of the present invention at various nanodiamond concentrations.

The friction of the composites is presented by comparing the friction coefficients. The friction coefficients of the FP-1 composites are presented in FIGS. 4 to 6. The lowest friction coefficient of the FP-1 composites was obtained with the composite 1-2 (FIG. 5). The friction coefficient was reduced down to 0.05 as the nanodiamond concentration in was 2.0 wt. %.

Wear

Figure 7:
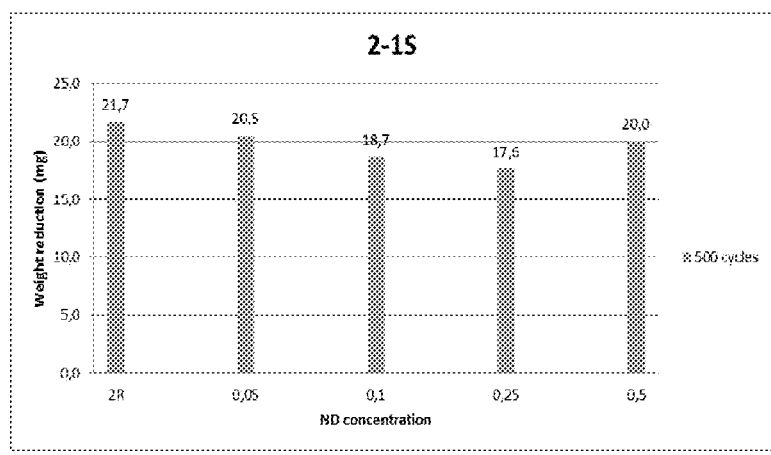
FIG. 7 shows the wear of a reference coating and a composite coating of the present invention at various nanodiamond concentrations.

The wear of the composites based on the FP-2 is presented in FIG. 7. The best wear resistance of the FP-2 composites was obtained with the composite 2-1S. The nanodiamond concentration was 0.25 wt. %. The wear of the coating at 500 cycles was 17.6 mg.

Structural Analysis

The structural analysis was based on the tribological results. On the basis of the results, the analysis was executed to some of the produced composite coatings. The analysis was done with SEM, in lower magnifications. For the composite 1-2 (2.0 wt. %) of the second set also pictures with greater magnification were taken.

First Set

Figure 8:
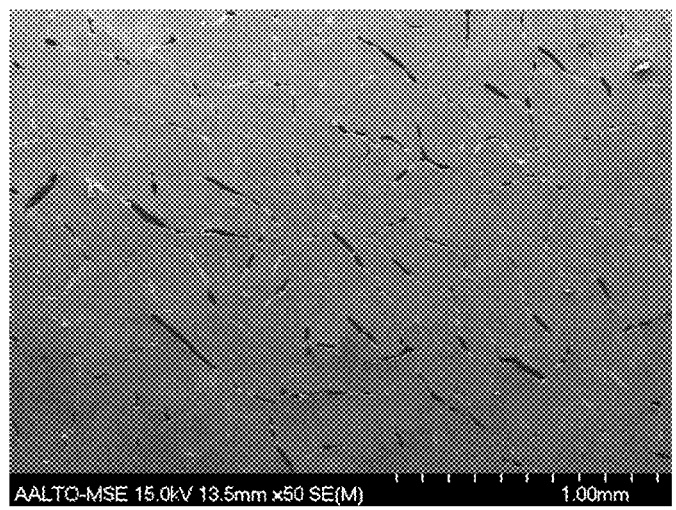
FIG. 8 shows a SEM picture of a composite coating of the present invention.

FIG. 8 presents the SEM pictures of the first set. In FIG. 8 the composite 1-2 was pictured in 50× magnification.

Second Set

Figure 9:
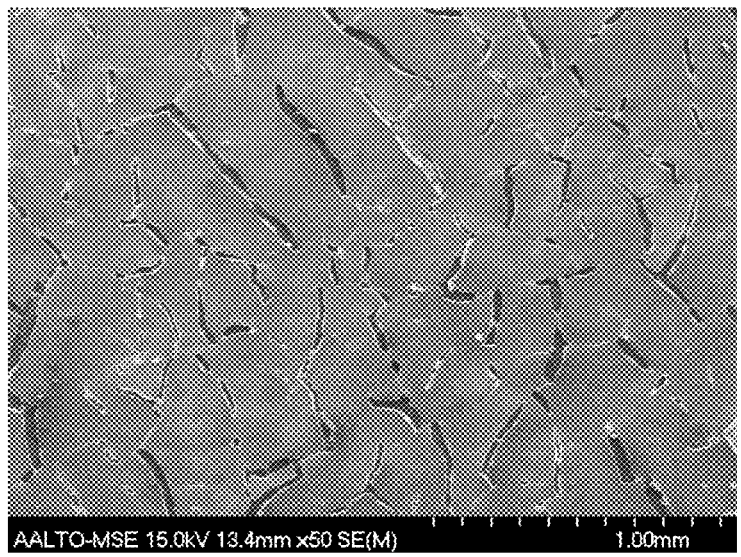
FIG. 9 shows a SEM picture of a reference coating.
Figure 10:
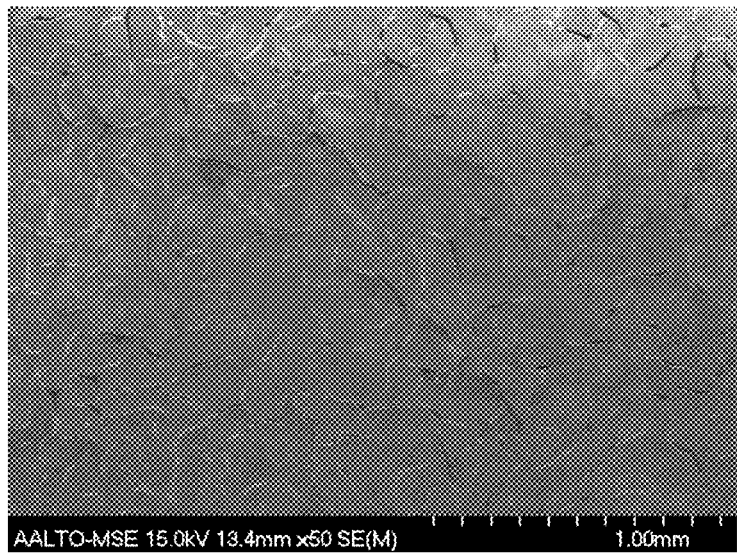
FIG. 10 shows a SEM picture of another composite coating of the present invention.

In FIG. 9, there is FP-1 reference sample for comparison to the composite. The magnification is 50×. The picture presented in FIG. 10 present the composite 1-2 (2.0 wt. %) in magnifications 50×.

Additional Wear Tests

Figure 11:
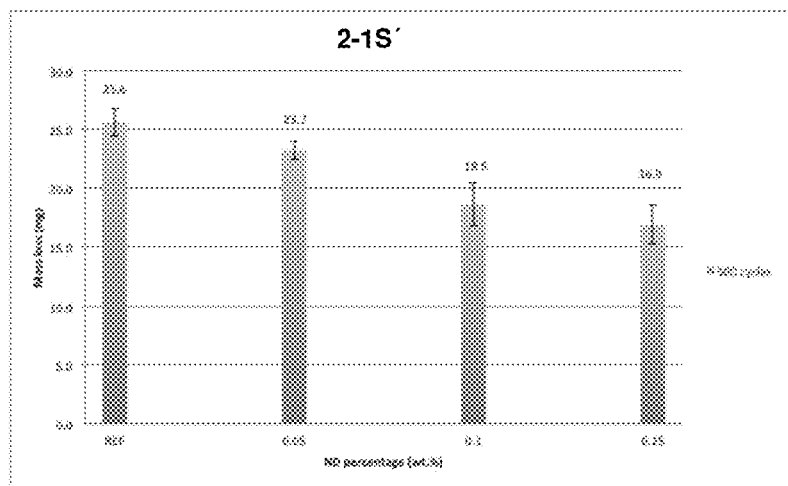
FIG. 11 shows the wear of a reference coating and a composite coating of the present invention at various nanodiamond concentrations.
Figure 12:
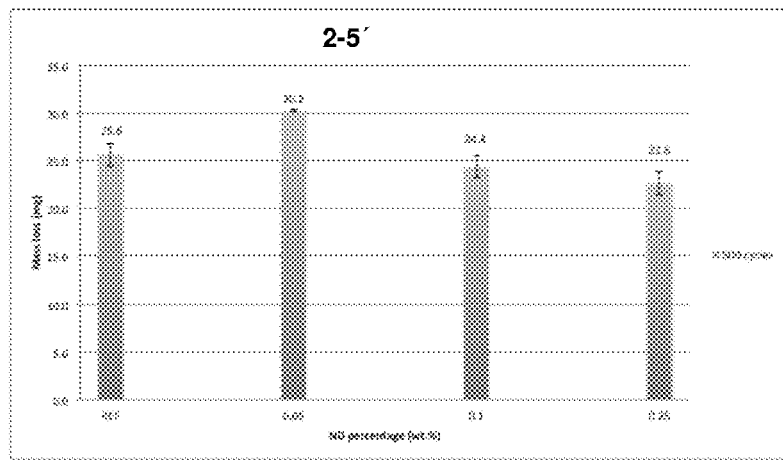
FIG. 12 shows the wear of a reference coating and a composite coating of the present invention at various nanodiamond concentrations.

In FIGS. 11 and 12 are presented additional wear tests. The tests were performed as presented above.

In FIG. 11 wear of the coating composites based on the FP-2 with several nanodiamond particle (ND-1S') concentrations is presented. The nanodiamond particle 1S' has the same features as nanodiamond particle 1S with the difference that the zeta potential of 1S' is −55 mV. The higher negative zeta potential of 1S' is originating from the higher degree of carboxylic acid termination on nanodiamond surface as compared to nanodiamond particle 1S. The best wear resistance within the studied nanodiamond concentration range was obtained with nanodiamond concentration 0.25 wt. %. The wear of the coating at 500 cycles was 16.9 mg. That is, 34% reduction in wear compared to the reference.

In FIG. 12 wear of the coating composites based on the FP-2 with several nanodiamond particle (ND-5') concentrations are presented. Surface of the nanodiamond particle 5' is predominantly hydrogen terminated, giving it a higher positive zeta potential than that of nanodiamond particles 5 applied in earlier examples. The applied hydrogen terminated nanodiamond particle 5' has zeta potential +55 mV. The best wear resistance was obtained with nanodiamond concentration 0.25 wt. %. The wear of the coating at 500 cycles was 22.6 mg. That is, 11.7% reduction in wear compared to the reference.

Discussion

The mixing tests were executed in order to discover the ability of ND grades to mix to fluoropolymers. The theory was that as the fluoropolymers have high negative zeta potential, the higher negative zeta potential the nanodiamonds have, the better the mixing (ND-1 and -2) into alkaline environment there might be. This assumption was confirmed. Further, it was concluded that it was possible to mix effectively ND-3/6 materials containing graphite and amorphous carbon to the fluoropolymer even though they feature positive zeta potential.

The improvement to the tribological properties resulting from the use of nanodiamond materials was found to depend on the nanodiamond properties, being the dispersion rate (agglomerate size) and used nanodiamond materials zeta potential in alkaline conditions, confirmed by the remarkably improved tribological properties as using ND-2 and ND-1S as nanodiamond additives. Both have highly negative zeta potential and the agglomerate size is small. ND-1S is even nearly single-digit. The excellent performance of the ND-6 is most probably resulting through the detonation soot included in the powder. The graphite as a plate-like structure is placing easily between the planar fluoropolymer molecules, thus improving the transfer layer formation and binding. The second set showed that the best results were obtained with 1-2 wt. % nanodiamond content with compatible nanodiamond suspensions and 0.25 wt. % with compatible nanodiamond dispersions.

The results show that the key factors that affect the tribological properties of the composite are the dispersion rate of nanodiamonds in the coatings, the concentration of nanodiamonds and the initial properties of the starting materials, being the zeta potential, the agglomerate particle size and the used fluoropolymer media pH. The coating dispersion rate is greatly directed by the nanodiamond primary particle surface chemistry, which is easily measurable through the material distinctive zeta potential property. It was found that as dispersing nanodiamond materials into alkaline fluoropolymer suspensions, the best agglomeration control and thus best fluoropolymer mechanical properties are receivable with nanodiamonds possessing as high as possible negative zeta potential value. Also the planarity of the graphite-like particles of ND-3 and -6 improve the dispersion and thus the tribological properties.

The tribological results of the first set of the coatings showed that both the wear and friction properties were improved. The results of the first and second set of the coatings are set forth in Tables 7 and 8. The concentrations that were compared were 0.1 and 1.0 wt. %, for dispersion and suspension grades of ND, respectively.

In Table 7 the friction properties of a reference sample, samples 1-1, 1-2 and 1-6) of sets FP-1 and FP-2 are compared. All the compared composite samples featured reduced friction properties. The COF's of the FP-1 and FP-2 references remained quite constant.

TABLE 7

|  | Set | |
| --- | --- | --- |
|  | 1 | 2 |
| 1R | 0.138 | 0.141 |
| 1-1 | 0.103 | 0.071 |
| 1-2 | 0.090 | 0.075 |
| 1-6 (3) | 0.087 | 0.109 |

Table 8 compares the wear data obtained in said two sets. The wear properties of the FP-1 composites were improved. The wear properties of the FP-2 composites showed generally to be remarkably reproducible in the second set.

TABLE 8

|  | Set | |
| --- | --- | --- |
|  | 1 | 2 |
| 1R | 16.20 | 12.00 |
| 1-1 | 15.43 | 15.27 |
| 1-2 | 14.17 | 13.63 |
| 1-6 (3) | 11.17 | 9.20 |
| 2R | 27.43 | 21.65 |
| 2-1S | 18.57 | 18.67 |
| 2-2 | 20.10 | 18.90 |
| 2-6 (3) | 20.07 | 17.17 |

The same principles and parameters were used in preparation and coating experiments of both sets. However, the FP-1 and FP-2 references in the second set improved significantly as compared to the first set and was based on a slightly longer curing period in otherwise the same curing temperature. Hence, the nanodiamond addition is expected to give certain improvement in fluoropolymer coating mechanical properties, as compared to a reference sample deposited and cured at the same time, and thus through otherwise similar manufacturing conditions.

The structure photos taken with SEM show the basic structure of the polymers. Comparing FIGS. 8, 9 and 10, it is clear that nanodiamond addition changes the structure of the PTFE. The structure can be seen to change so that the crack width was reduced due to the nanodiamond addition in FIG. 8 and FIG. 10 representing the present invention as compared to the structure of FIG. 9 representing a reference sample.

It can be concluded that nanodiamond addition improves tribological properties of the fluoropolymer: both wear and friction, and that the best results were obtained with composites 1-2 and 2-6 with an addition of 1.0-2.0 wt. % of nanodiamonds.

The invention claimed is:

1. A fluoropolymer coating comprising nanodiamond particles in a concentration between 0.01% by weight and 5% by weight, wherein said fluoropolymer coating is obtained by drying and curing a slurry composition comprising said fluoropolymer and nanodiamond particles, wherein the zeta potential of the nanodiamond particles has a value more negative than −30 mV at pH higher than 8, and wherein friction coefficient of said coating is at most 0.08.

2. The fluoropolymer coating according to claim 1, wherein the concentration of the nanodiamonds is between 0.1% by weight and 4% by weight.

3. The fluoropolymer coating according to claim 1, wherein the concentration of the nanodiamonds is between 0.1% by weight and 3% by weight.

4. The fluoropolymer coating according to claim 1, wherein the concentration of the nanodiamonds is between 1% by weight and 3% by weight.

5. The fluoropolymer coating according to claim 1, wherein the coating comprises polytetrafluoroethylene and friction coefficient of the coating is at most 0.08.

6. The fluoropolymer coating according to claim 5, wherein the friction coefficient is at most 0.07.

7. The fluoropolymer coating according to claim 1, wherein said coating shows a wear which is reduced at least by 10% as compared to a reference sample without any nanodiamond addition, measured at room temperature.

8. The fluoropolymer coating according to claim 7, wherein the wear is reduced at least by 25%.

9. The fluoropolymer coating according to claim 1, wherein the pH of the slurry is within the alkaline region.

10. The fluoropolymer coating according to claim 1, wherein the pH is at least 8.

11. The fluoropolymer coating according to claim 1 wherein the pH is between 9 and 11.

12. The fluoropolymer coating according to claim 1, wherein the pH is between 9 and 10.

13. The fluoropolymer coating according to claim 1, wherein the zeta potential of the nanodiamond particles has a value more negative than −40 mV at pH higher than 8.

* * * * *